INVENTOR.
EDGAR A. BROWN
BY Paul M. Brannen
AGENT

United States Patent Office 2,939,117
Patented May 31, 1960

2,939,117

MAGNETIC CORE STORAGE DEVICE WITH FLUX CONTROLLING AUXILIARY WINDINGS

Edgar A. Brown, Owego, N.Y., assignor to International Business Machines Corporation, New York, N.Y., a corporation of New York Filed June 26, 1956, Ser. No. 593,881
5 Claims. (Cl. 340—174)

This invention relates to magnetic core storage devices and particularly to an improved form of magnetic core storage device employing auxiliary or selection windings for selectively establishing predetermined flux paths in the core.

A core of magnetic material having a hysteresis loop may be caused to attain one or the other of its two stable remanent flux states to thereby represent information by pulsing windings that link the magnetic circuit. Interrogation by conventional means results in the core being set to a selected one of its two remanent flux states, so that the stored information is destroyed.

Non-destructive sensing of the remanent flux state of the core may be attained by employing a transverse winding arranged to set up an auxiliary flux in the core which reacts with the remanent flux in such manner as to produce a net flux change in the core. A voltage is thereby induced in a suitable output winding linking the core, the polarity of the output voltage being dependent only upon the sense of the remanent flux. Such an arrangement is disclosed and claimed in a copending application, Serial No. 383,568, filed on October 1, 1953, on behalf of E. A. Brown.

In the prior application, conventional input and output windings are provided for the core, and the sampling or sense winding is arranged in the manner described and claimed therein to provide output pulses indicative of the sense of the remanent flux, as established by suitable energization of the input winding. The input and sampling windings are separate in function and construction. In the event that it is desired to employ core storage devices of this type in a two or more coordinate selection system, or so-called "matrix," it would be necessary to employ two or more separate input windings or to provide some other suitable means for insuring that the sense of the remanent flux could be reversed only by selection of two or more coordinate driving lines connected to the input windings.

According to the present invention, a storage element utilizing a magnetic core is provided in which a single winding, hereinafter referred to as a control winding, may be employed as either an input winding or as a sampling winding. The dual action of the control winding is governed by two auxiliary or selection windings, which may in turn be governed by a suitable arrangement to provide two-coordinate selection of a specified core in a matrix. When both of the selection windings are rendered effective they inhibit flux change in certain paths and force the flux set up by the energization of the control winding to traverse the entire core. The control winding is then effective in setting the core to one or the other of its two stable remanent flux states, depending upon the polarity of energization of the control winding. When either or both of the auxiliary or selection windings are not effective, flux changes resulting from energization of the control winding are effective to cause the induction of a pulse in the readout or output winding, without reversing the sense of the remanent flux in the core.

Thus a single winding, the control winding, is effective as in input winding to set the core in the desired state, or as a sampling winding for reading the state of the core non-destructively.

It is accordingly an object of this invention to provide an improved magnetic core storage device, in which a single control winding functions as either an input or a sampling winding.

Another object of the invention is to provide an improved magnetic core storage device, in which a single winding is effective as either an input or a sampling winding, in accordance with the establishment of different flux paths for the flux generated by the winding.

A further object of the invention is to provide an improved magnetic core storage device having a single control winding which is effective as either an input winding or a sampling winding, in accordance with the effectiveness or ineffectiveness of a pair of auxiliary windings which govern the path transversed by the flux created in the core when the control winding is energized.

Still another object of the invention is to provide a magnetic core storage device having a single control winding, which is governed in accordance with the open-circuited or short-circuited condition of a pair of auxiliary windings, to act as either an input winding or a sampling winding.

A further object of the invention is to provide an improved magnetic core storage device.

Other objects of the invention will be pointed out in the following description and claims and illustrated in the accompanying drawings, which disclose by way of examples, the principle of this invention and the best mode which has been contemplated of applying that principle.

In the drawings.

Similar reference characters refer to similar parts in each of the several views.

Magnetic cores have residual flux density and may be placed in either one of two stable states of remanent flux by means of windings on the core to which pulses are applied. Core material for this purpose may have a hysteresis loop or curve such as that illustrated in Fig. 1, however, the present invention is not restricted to the use of any particular core materials.

Figure 1:
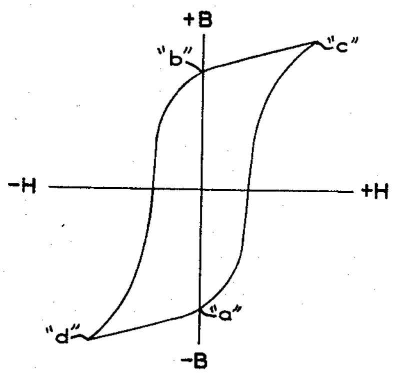
Fig. 1 is a diagram of the hysteresis curve, of a core of magnetic material suitable for use in the present invention.

Point "*a*" on the curve illustrated in Fig. 1 is arbitrarily selected as representing a binary zero, and point "*b*" is selected as representing a binary one. With a core initially magnetized in the zero-representing remanence state "*a*," storage of a binary one is accomplished by pulsing an input winding or windings to produce a magnetomotive force of +H magnitude and thereby cause the core material to transverse the hysteresis loop from point "*a*" to point "*c*." When the input pulse terminates, the core transfers or relaxes to point "*b*." Points "*a*" and "*b*" are stable states, and a core magnetized to either one of these states will remain in that state without the supply thereto of external energy.

With a core in state "*a*" initially, storage of a binary zero is accomplished either by failure to apply a magnetomotive force or by application of a −H magnetomotive force. In the latter case, the hysteresis loop is traversed from point "a" to point "d," and on termination of the zero read-in pulse, returns to point "a."

In interrogating a magnetic element to determine which of the two states "a" or "b" are stored, prior art devices apply a read-out pulse of —H to a winding on the core and the voltage induced in another winding on the core is observed. When in state "b," representing a binary one, application of such a magnetomotive force causes the core to traverse its hysteresis loop from point "b" to point "d," and, on termination of the force, to point "a." This change in flux produces a significant output pulse in an output winding linking the core. With the core in state "a," representing a binary zero, application of a readout pulse causes a traversal from point "a" to point "d" and return to point "a." The flux change under these conditions is relatively small and accordingly an insignificant voltage pulse is induced in the output winding. With the core in either a binary one or a binary zero state, the readout operation has reset the core to point "a" and, if the information previously contained was a binary one, this information is destroyed by the readout process.

To obviate the destruction of stored information, the prior Brown application provides a sampling or sensing winding for the core, in addition to the usual input and output windings. The sample winding is arranged to create an auxiliary flux in the core which reacts with the principal or remanent flux in such manner that energization of the sampling winding will cause an output voltage to be induced in the output winding indicative of the sense of the remanent flux and independent of the polarity of the energy supplied to the sampling winding. In the embodiment disclosed in Fig. 2 of the prior Brown application, the sampling winding is wound through a pair of openings in the core in such manner that the axis of the sampling winding is substantially normal to the principal flux path in the core.

As previously pointed out, the input and sampling windings of the prior Brown application are separate in structure and function, the input winding being of the conventional type. Where conventional input windings are employed for cores arranged in so-called coincident current selection matrices, the input currents must be carefully controlled so that when and only when currents of suitable polarity and magnitude are supplied to two windings on the core, the resultant magnetomotive force is of sufficient magnitude to cause the core to be switched from one state to the other.

Figure 2:
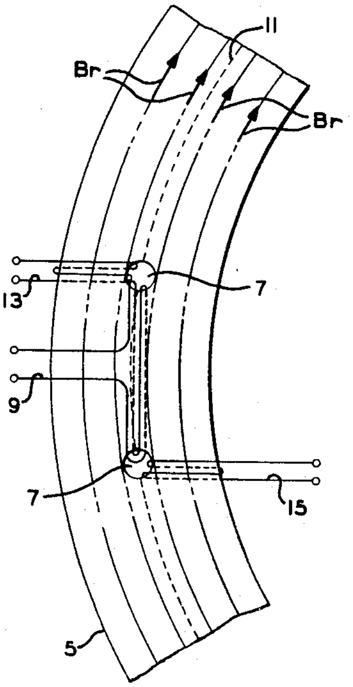
Fig. 2 is enlarged fragmentary and diagrammatic illustration of a core arranged in accordance with a preferred embodiment of the invention.

Referring now to Fig. 2 of the drawings, there is shown a view of a portion of a toroidal core 5, of material which may have a hysteresis curve similar to that shown in Fig. 1. The core is provided with a pair of spaced openings 7, which are drilled or otherwise formed in the core material. These openings may either be aligned axially with the axis of the core as shown, or may be aligned radially with the axis of the core, or at any angle with respect to the axis of the core.

A control winding 9 is wound through the openings 7 and around the portion of the core 5 between the openings as shown, so that the axis of the control winding is substantially normal to the principal flux path in the core, which in the preferred embodiment is concurrent with the center line 11 of the core. The spacing of the openings 7 is preferably such that the area of core linked by winding 9 is at least as great as the maximum cross-sectional area of the core at any other point. The minimum spacing of the openings is a circumferential distance such that the cross sectional area linked by or in the plane of winding 9 is equal to the maximum cross sectional area of the core at any other position of the core, and the maximum spacing is at diametrically opposite points on the core.

A first auxiliary or selection winding 13 is wound through one of the openings 7 of the core 5 and about the core as shown, so that this winding effectively links substantially one-half of the cross-sectional area of the core at one end of the portion of the core linked by the control winding 9. A second auxiliary or selection winding 15 similar to the first auxiliary winding 13 is wound through the other opening 7 in the core and around the portion of the core not linked by the first auxiliary winding, so that the second auxiliary winding effectively links the other half of the cross-sectional area of the core 5 at the other end of the portion of the core linked by the control winding 9.

Figure 3:
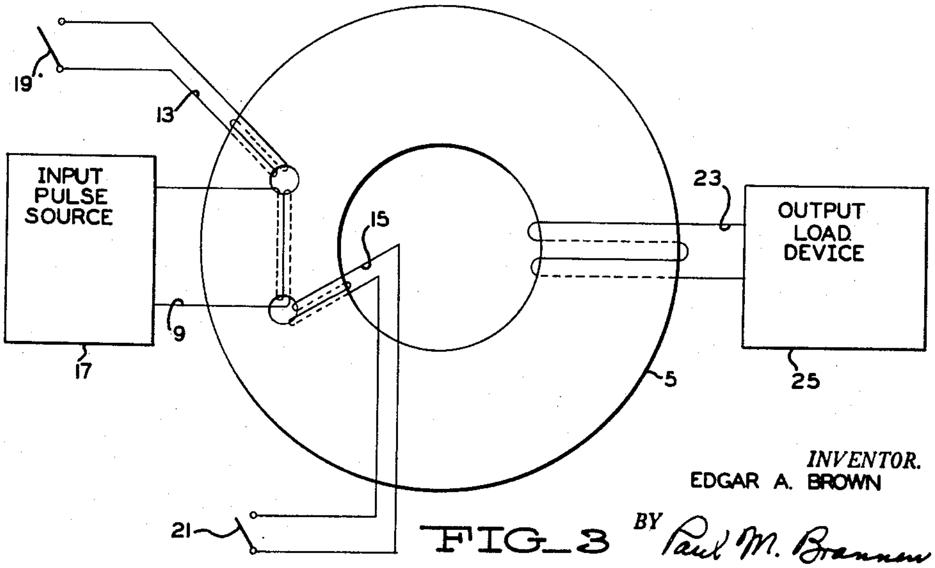
Fig. 3 is a diagrammatic view of one circuit arrangement which may be employed in connection with the present invention.

In Fig. 3, a core having windings arranged as shown in Fig. 2 is shown with a simplified arrangement of circuits for illustrating the operation of the device. As shown, the control winding 9 is connected to a suitable source of pulse energy 17, which is capable of supplying pulses of either relative polarity, as desired, to the control winding 9. Windings 13 and 15 are connected to switches 19 and 21, respectively, so that when the associated switch is open, the auxiliary winding is open-circuited, and when the associated switch is closed, the auxiliary winding is short-circuited. A conventional output winding 23, linking the core 5, is connected to a suitable output load device 25, which is arranged to provide a suitable response to output voltages from winding 23, indicative of the relative polarity of such output pulses.

In describing the operation of the apparatus shown in Fig. 3, it will first be assumed that the remanent flux in the core is at the +B value, as indicated by point "b" on the hysteresis loop shown in Fig. 1, and that in this case the sense of the flux is clockwise, as indicated by the dot-dash arrowed lines in Fig. 2.

With switches 19 and 21 both open, so that the flux control or selection windings 13 and 15 are both open-circuited, a pulse of energy of either relative polarity supplied from source 17 to winding 9 will be effective to create an auxiliary flux in the section of the core 5 between openings 7 substantially normal to the remanent flux in core 5.

The auxiliary flux thus produced by winding 9 reacts with the remanent flux in such manner that an output voltage pulse is induced in winding 23, the relative polarity of this pulse being determined only by the sense of the remanent flux in core 5, and being independent of the relative polarity of the pulses supplied to the winding 9, as explained in detail in the afore-mentioned Brown application.

Moreover, the core 5 may be repetitively sampled by pulses supplied to control winding 9, without destroying the sense of the remanent flux therein, although the first few sampling operations may reduce the magnitude of the remanent flux, but the sense will remain the same, and will therefore continue to produce the same polarity response from the output load device 25.

It can be seen, therefore, that the supply of pulses of either polarity to winding 9, with selection windings 13 and 15 open-circuited, is effective to sample the remanent flux of the core to indicate the binary value stored therein, without the loss of the stored information.

It will now be assumed that switches 13 and 19 are both closed, so that the selection windings are effectively short-circuited, i.e., a relatively low-impedance circuit is provided for any current which may flow in the windings 13 and 15 as a result of voltages induced in these windings.

Referring now to Fig. 2, let it be assumed that with switches 19 and 21 closed, a pulse of current is supplied to winding 9 of such polarity that the flux set up in the portion of the core between opening 7 is in the direction from right to left. The flux which would normally circulate locally about the openings 7 and through the winding 9 is now forced to traverse the principal flux path, including the entire core, since any flux which attempts to circulate locally through the paths including windings 13 and 15 is counteracted by an opposing flux, set up as a result of the induced current flowing in the low impedance circuit including the selection winding.

Considering this action in detail, any change in flux in the portions of the core linked by the short circuited windings will induce a voltage in these windings. The resultant current flow will be in such a direction that a magnetic field created by this current will oppose the changing magnetic flux which causes the induction, in accordance with Lenz's law that induced currents always act to oppose the changes which create them. Thus, looking at Fig. 2, the flux created by energizing winding 9 is impeded from flowing in any path which links the short circuited windings 13 and 15, and hence the principal portion of the flux set up by energization of winding 9 is forced to flow around the principal flux path of the core, rather than circulating in paths local to winding 9, as it does when windings 13 and 15 are open circuited.

With the parts proportioned and arranged so that the current in the control winding is of sufficient magnitude to saturate the portion of the core between openings 7, and with the cross-sectional area of this portion substantially equal to or greater than the cross-sectional area of the core taken at any other point, the magnetomotive force will be sufficient to cause the flux in the core to approach point "*d*" on the hysteresis loop of Fig. 1. When the input pulse terminates, the core relaxes to its —B remanent state, indicated at point "*a*" on the hystersis loop.

Accordingly, it is seen that with both of the selection windings effectively short-circuited, the control winding is capable of setting the core to either one of its two stable remanent flux states, in accordance with the polarity of the energy supplied to the control winding. Thus the control winding is enabled to carry out the dual function of input and sampling, usually requiring separate windings.

Since it is necessary that both selection windings be effectively short-circuited in order to enable the control winding to switch the core, suitable matrix arrangements, requiring coincident control of both windings, may be employed, without the necessity for supplying closely controlled magnitudes of current to the windings of the core. The selection windings may be employed to provide a two-coordinate matrix, and by suitably connecting the control windings, a third dimensional selection may be obtained.

The disposition of the windings may be varied from that shown in the drawings, as long as a proper balance is preserved in the magnetic circuit relations. For example, variations in symmetry as a result of particular core configurations may be compensated for by suitably balancing the selection windings 13 and 15 or by adjustment of the short-circuit impedance of the windings by external impedance.

Figure 4:
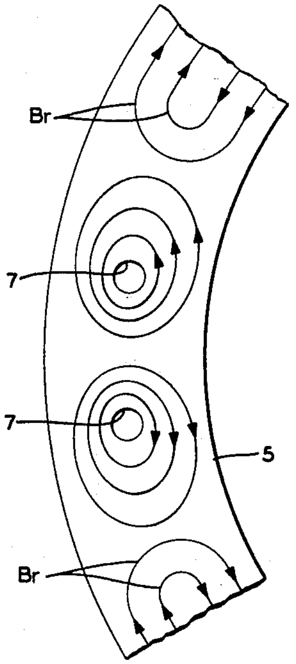
Figs. 4 and 5 are diagrammatic illustrations of the flux paths in a magnetic core during two of the operating conditions according to the invention.

Fig. 4 illustrates the paths taken by the remanent flux and the flux set up by the control winding during a sampling or interrogating operation. The windings are not shown for the sake of clarity. Energization of the sampling winding, while the auxiliary windings are ineffective, causes local flux paths to be set up in the region of the control winding as shown, so that the core in the vicinity of the openings 7 is saturated. The remanent flux Br therefore takes a so-called "kidney" shaped path, and this change produces an appropriate signal in the output winding. Termination of the sampling pulse allows the remanent flux to circulate in the usual manner as shown in Fig. 2. Use of the other polarity of sampling energy will obviously produce the same effect, insofar as the remanent flux is concerned.

Figure 5:
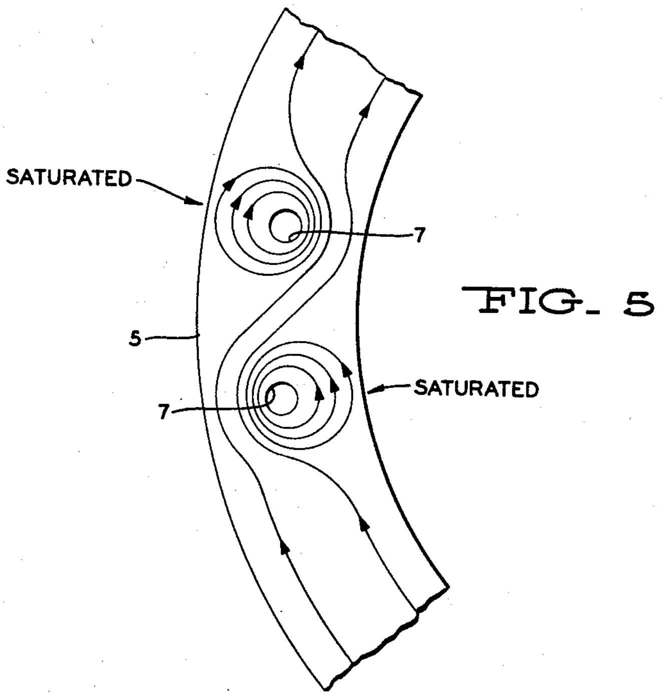

Fig. 5 illustrates the condition in which the auxiliary windings are effective to set up a counter flux and thereby cause the flux generated by energization of the control winding to set the remanent flux in the core to a desired state. In the illustrated instance, the energization of the control winding is assumed to be such that flux is directed inwardly between the openings 7 of core 5. With the control windings effective the region between the outermost edge of the core and the upper opening 7 will be saturated, as will the region between the innermost edge of the core and the lower opening 7. Since little or no flux generated by the control winding can flow in these paths it will be seen that the flux will flow through the path including the remainder of the core, and thereby set the remanent flux in a clockwise state. Reversal of energization of the control winding will obviously produce a similar effect but with oppositely directed remanent flux.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic core storage device comprising a closed core of magnetic material having two stable remanent flux states and having a principal flux path divided into substantially equal inner and outer circumferential flux paths, a pair of spaced openings in said core disposed between said inner and outer flux paths and defining a transverse section of said core between said openings substantially at right angles to said principal flux path, said transverse section having a cross sectional area at least as great as the maximum cross sectional area of said core, a control winding linking said transverse section of said core, said control winding being effective when energized to create flux in said transverse section in a direction substantially at right angles to said principal flux path, a first auxiliary winding threaded through one of said openings and about said inner circumferential flux path, a second auxiliary winding threaded through the other of said openings and about said outer circumferential flux path, switching means associated with said first and said second auxiliary windings effective at times to generate flux in said inner and outer flux paths which opposes the flux generated by said control winding, and an output winding linking said core.

2. A magnetic core storage device comprising a closed core of magnetic material having two stable remanent flux states and having a principal flux path divided into substantially equal inner and outer circumferential flux paths, a pair of spaced openings in said core defining a transverse section of said core substantially at right angles to said principal flux path, said transverse section having a cross sectional area at least as great as the maximum cross sectional area of said core, a control winding threaded through said openings whereby the winding encircles said transverse section of said core, said control winding being effective when energized to create flux in said transverse section, a first auxiliary winding threaded through one of said openings and about said inner circumferential flux path, a second auxiliary winding threaded through the other of said opeings and about said outer circumferential flux path, switching means associated with said first and said second auxiliary windings effective at times to generate flux in said inner and outer flux paths which opposes the flux generated by said control winding, and an output winding linking said core.

3. A magnetic core storage device comprising a closed core of magnetic material having two stable remanent flux states and having a principal flux path divided into substantially equal inner and outer circumferential flux paths, a pair of spaced openings in said core disposed between said inner and outer flux paths and defining a transverse section of said core between said openings substantially at right angles to said principal flux path, said transverse section having a cross sectional area at least as great as the maximum cross sectional area of the core, a control winding linking said transverse section of said core, said control winding being effective when energized to create flux in said transverse section in a direction substantially at right angles to said principal flux path, a first auxiliary winding threaded through one of said openings and about said inner circumferential flux path, a second auxiliary winding threaded through the other of said openings and about said outer circumferential flux path, switching means associated with each of said first and said second windings for at times establishing a low-impedance connection across the terminals of the windings, whereby the flux generated by said control winding will be opposed by the counter flux created by said auxiliary windings, and an output winding linking said core.

4. A magnetic core storage device comprising a closed core of magnetic material having two stable remanent flux states and having a principal flux path divided into substantially equal inner and outer circumferential flux paths, a pair of spaced openings in said core defining a transverse section of said core substantially at right angles to said principal flux path, said transverse section having a cross sectional area at least as great as the maximum cross sectional area of said core, a control winding threaded through said openings whereby the winding encircles said transverse section of said core, said control winding being effective when energized to create flux in said transverse section, a first auxiliary winding threaded through one of said openings and about said inner circumferential flux path, a second auxiliary winding threaded through the other of said openings and about said outer circumferential flux path, switching means associated with each of said first and said second windings for at times establishing a low impedance connection across the terminals of the windings, whereby the flux generated by said control winding will be opposed by the counter flux created by said auxiliary windings, and an output winding linking said core.

5. A magnetic core storage device comprising a closed core of magnetic material having two stable states of remanent flux, said core having a principal flux path coinciding substantially with the center line of the core and divided into inner and outer circumferential flux paths, a pair of spaced openings disposed substantially on the center line of said core to define a transverse section of the core between said openings, said transverse section having a cross sectional area at least as great as the maximum cross sectional area of said core, a control winding threaded through said openings to encircle said transverse section, means for at times energizing said control winding with energy of one or the other of two polarities, whereby flux is generated in said transverse section in a first or a second sense, a first auxiliary winding threaded through one of said openings and about said inner circumferential flux path, a second auxiliary winding threaded through the other of said openings and about said outer circumferential flux path, an output winding linking said core, and switching means associated with said first and said second auxiliary windings, said switching means being operative at times to effectively short-circuit said first and said second windings.

References Cited in the file of this patent

UNITED STATES PATENTS

| | | |
|---|---|---|
| 2,733,424 | Chen | Jan. 31, 1956 |
| 2,808,578 | Goodell et al. | Oct. 1, 1957 |
| 2,818,556 | Lo | Dec. 31, 1957 |
| 2,842,755 | Lamy | July 8, 1958 |

OTHER REFERENCES

Publication I, "The Transfluxor" (Rajchman), Proceedings of the I.R.E., vol. 44, issue 3, March 1956, pp. 321–332.